UNITED STATES PATENT OFFICE.

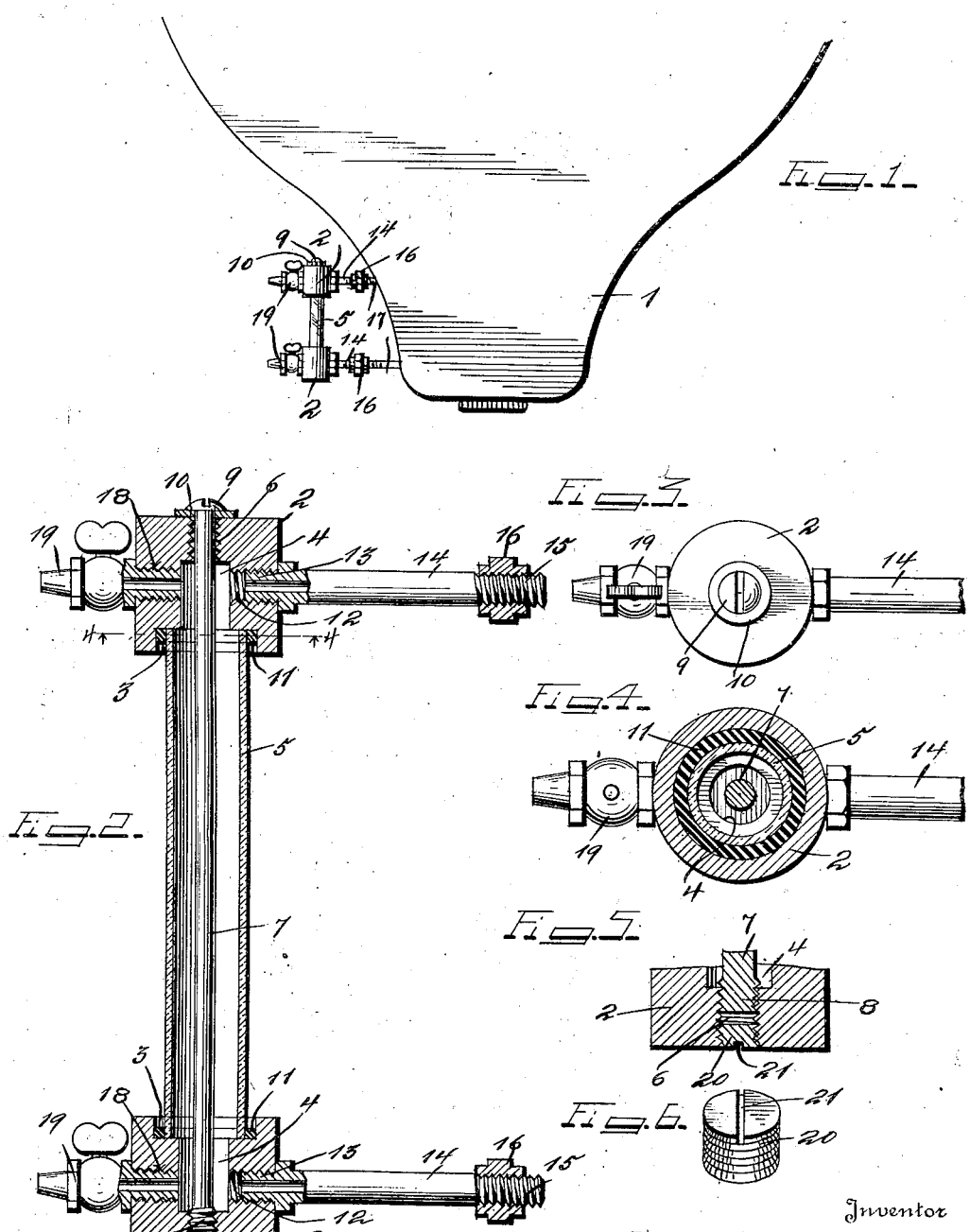

JOHN N. BAGLEY, OF SUPERIOR, NEBRASKA.

OIL-GAGE.

1,110,474.  Specification of Letters Patent.  Patented Sept. 15, 1914.

Application filed February 9, 1914.  Serial No. 817,643.

*To all whom it may concern:*

Be it known that I, JOHN N. BAGLEY, a citizen of the United States of America, residing at Superior, in the county of Nuckolls and State of Nebraska, have invented certain new and useful Improvements in Oil-Gages, of which the following is a specification, reference being had therein to the accompanying drawing.

This invention relates to an oil gage for a crank casing of an automobile and the principal object of the same is the production of a simple and efficient device for determining the depth of the oil within the casing.

Another object of this invention is the production of an oil gage which is provided with a plurality of similarly constructed heads which are adapted to carry the indicating tube in such a manner as to allow the same to be easily used.

With these and other objects in view this invention consists of certain novel combinations, constructions and arrangements of parts as will be hereinafter fully described and claimed.

In the accompanying drawings:—Figure 1 is an elevation of a portion of a crank casing showing the oil gage carried thereby. Fig. 2 is a central vertical section through the oil gage. Fig. 3 is a top plan view of the oil gage. Fig. 4 is a section taken on line 4—4, of Fig. 2 looking in the direction of the arrow. Fig. 5 is a fragmentary sectional view of a portion of the device illustrating how the retaining screw is held in position. Fig. 6 is a detail perspective view of a certain plug used with this invention.

Referring to the accompanying drawings by numerals 1 designates in general a crank casing of an automobile upon which this oil gage is adapted to be used. The oil gage comprises a plurality of heads which are formed similarly to each other so as to be interchangeable if desired and so as to be cast by a single mold. Each head comprises a body 2 having an enlarged shallow pocket 3 communicating with a comparatively deep socket 4. A hollow glass tube 5 is adapted to fit in the pocket 3 of each head so as to overhang the socket 4. Each head is also provided with an internally threaded passage 6 communicating with the socket 4. When the glass tube 5 is in position it will overhang the socket 4 and be positioned in alinement with the threaded passages 6. A retaining screw 7 comprising an elongated straight body is passed through the passages 6, sockets 4, and pockets 3 and is provided at one end with the threaded portion 8 for engaging one of the threaded passages 6. The opposite end of the retaining screw 7 is provided with a head 9 bearing upon a washer 10 for efficiently closing the passage 6 adjacent this portion of the screw. It will be seen that by rotating the screw 7 by means of the head 9, the body 2 will be drawn into firm engagement with the end portions of the glass tube 5. A packing gasket 11 is positioned upon each end of the glass tube 5 so as to be in position within the pocket 3 of each body 2. These gaskets 11 are compressed, since they are formed of rubber or similar material, by the placing of the ends of the tube within the pockets 3 and therefore the gaskets will bind upon the tube and within the pockets, thereby efficiently closing the end portions of the glass tube 5 and preventing the oil from leaking. In order to attach this device to the casing 1, each body 2 is provided with a transverse threaded opening 12 which receives the threaded end 13 of the connecting pipe 14. Each pipe 14 is provided at its outer threaded end 15 with a threaded collar 16 adapted to engage the short pipes 17 carried by the casing 1. By the use of these collars 16 it will be seen that the pipes 14 will be held in firm engagement with the short pipe 17, thereby retaining the oil gage in its correct position for determining the amount of oil within the casing 1. Each body 2 is also provided with a transverse internally threaded bore 18 formed in alinement with the threaded openings 12, these bores 18 being adapted to receive the cocks 19. By forming the heads in this construction it will be seen that the same may be interchangeably mounted upon the glass tube 5, whereby when the device is cleaned it will not be necessary to place a particular head upon one end and another particular head upon the opposite end but either head may be placed in position and held in engagement with the glass tube 5 by means of the screw 7.

From the foregoing description it will be seen that since the device is held in an assembled position by means of the retaining screw 7, the device may be easily disassembled by the removal of the screw 7. It will also be noted that a screw plug 20 having a transverse slot 21 is adapted to be threaded into engagement with one of the threaded passages 6 for preventing the escaping of oil therethrough.

From the foregoing description it will be seen that a simple and efficient oil gage has been produced which will allow the amount of oil within the casing to be easily determined and which is so formed as to allow the same to be easily disassembled when so desired. It is, of course, obvious that when the oil passes through the lower pipe 14 and into the glass tube 5 the air within the glass tube will pass into the casing by means of the upper tube 14, thereby preventing the gage from becoming air logged.

Having thus described the invention what is claimed as new, is:—

An oil gage of the class described comprising a pair of heads, each head provided with a shallow pocket and with a reduced comparatively deep socket communicating with said pocket, said head also provided with a threaded passage extending therethrough and communicating with one end of said socket, said head also provided with an alined threaded opening and threaded bore, a glass tube having its ends extending into said shallow pockets, the side portions of said tube being positioned at a spaced distance from the side portions of the pocket, compressible gaskets positioned within said pockets and binding upon the side portions of the pockets and the outer portions of the tube, a screw passing through said tube and said heads and detachably engaging one of said threaded passages whereby the gage will be held in an assembled position, and feed pipes and drain cups carried by said threaded openings and threaded bores.

In testimony whereof I hereunto affix my signature in presence of two witnesses.

JOHN N. BAGLEY.

Witnesses:
  A. C. FELT,
  ILA L. ADAMS.